May 12, 1964     I. Z. SMOKER ETAL     3,132,754
BALE THROWING ATTACHMENT FOR BALING MACHINES
Filed Oct. 2, 1958     5 Sheets-Sheet 2
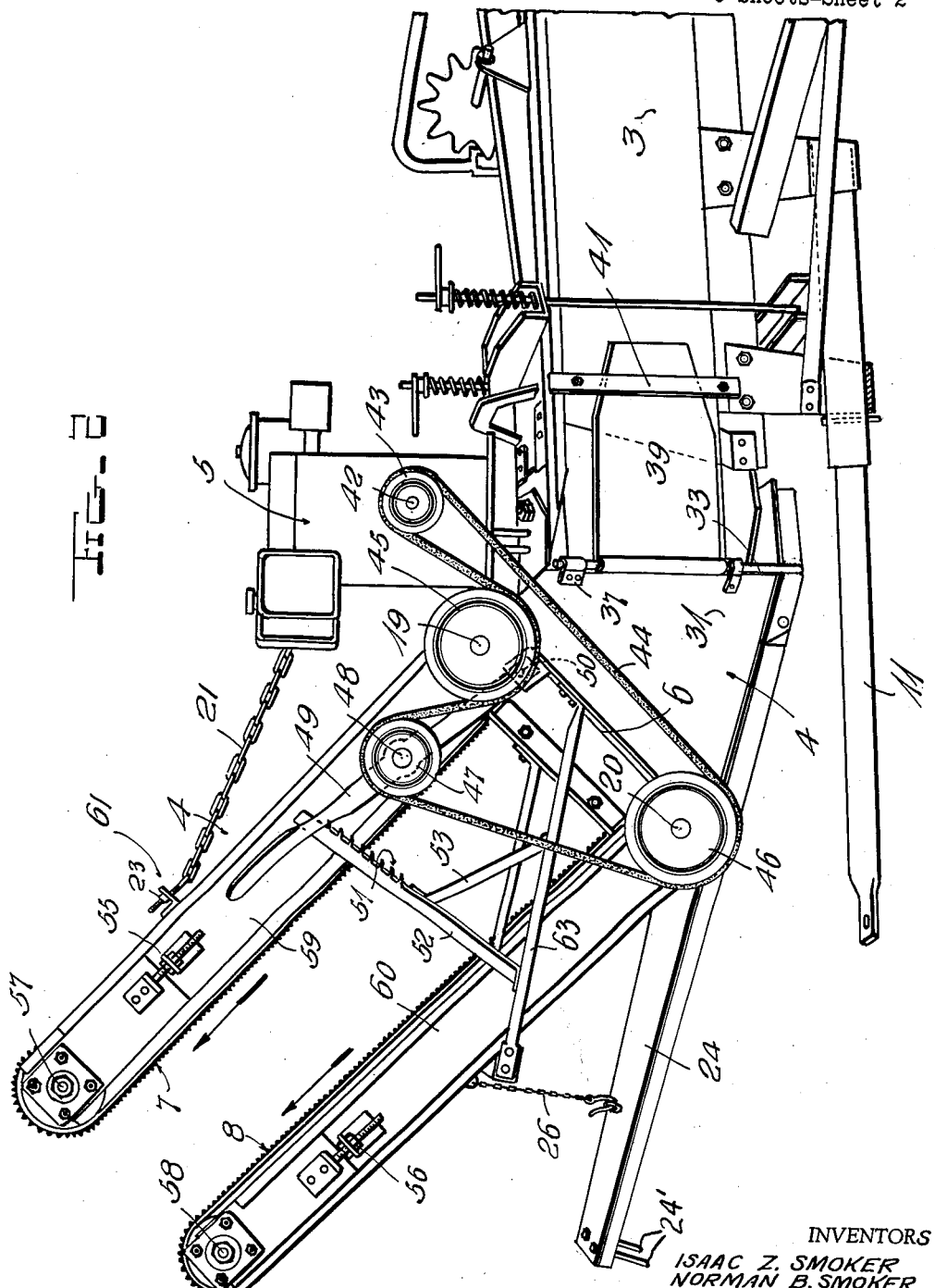
INVENTORS
ISAAC Z. SMOKER
NORMAN B. SMOKER
ALVIE R. BEACHY
AARON P. BEILER
BY
ATTORNEY May 12, 1964

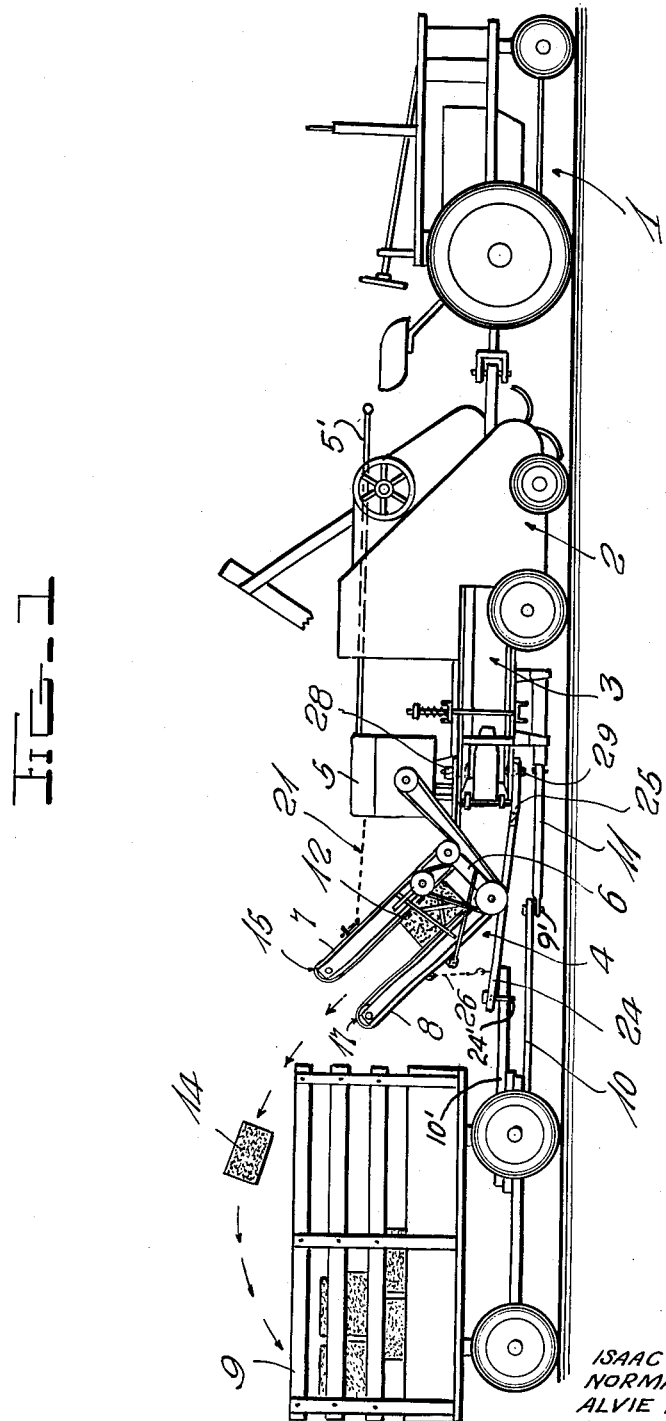

I. Z. SMOKER ETAL 3,132,754

BALE THROWING ATTACHMENT FOR BALING MACHINES

Filed Oct. 2, 1958

INVENTORS
ISAAC Z. SMOKER
NORMAN B. SMOKER
ALVIE R. BEACHY
AARON P. BEILER

BY John B. Brady

ATTORNEY

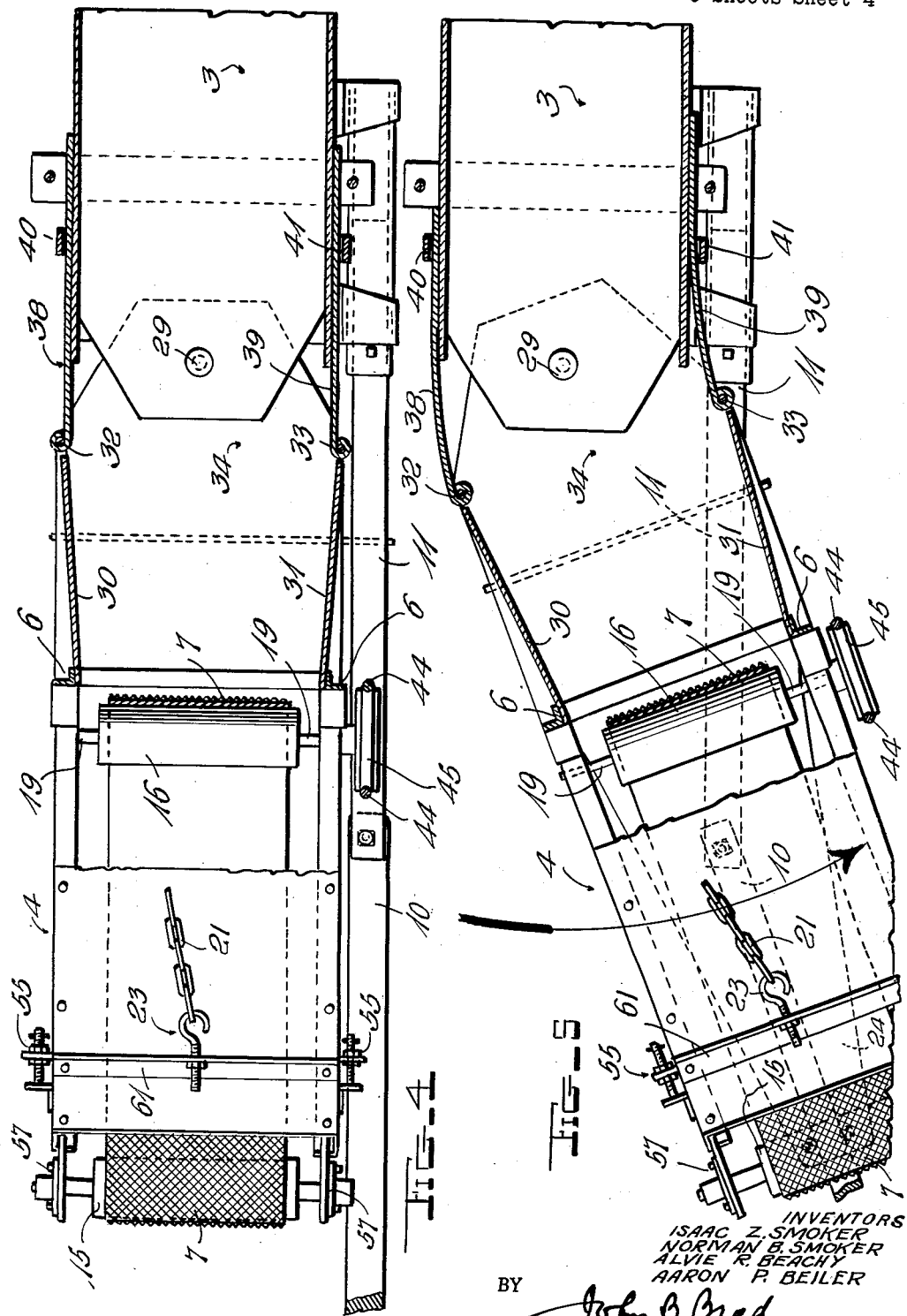

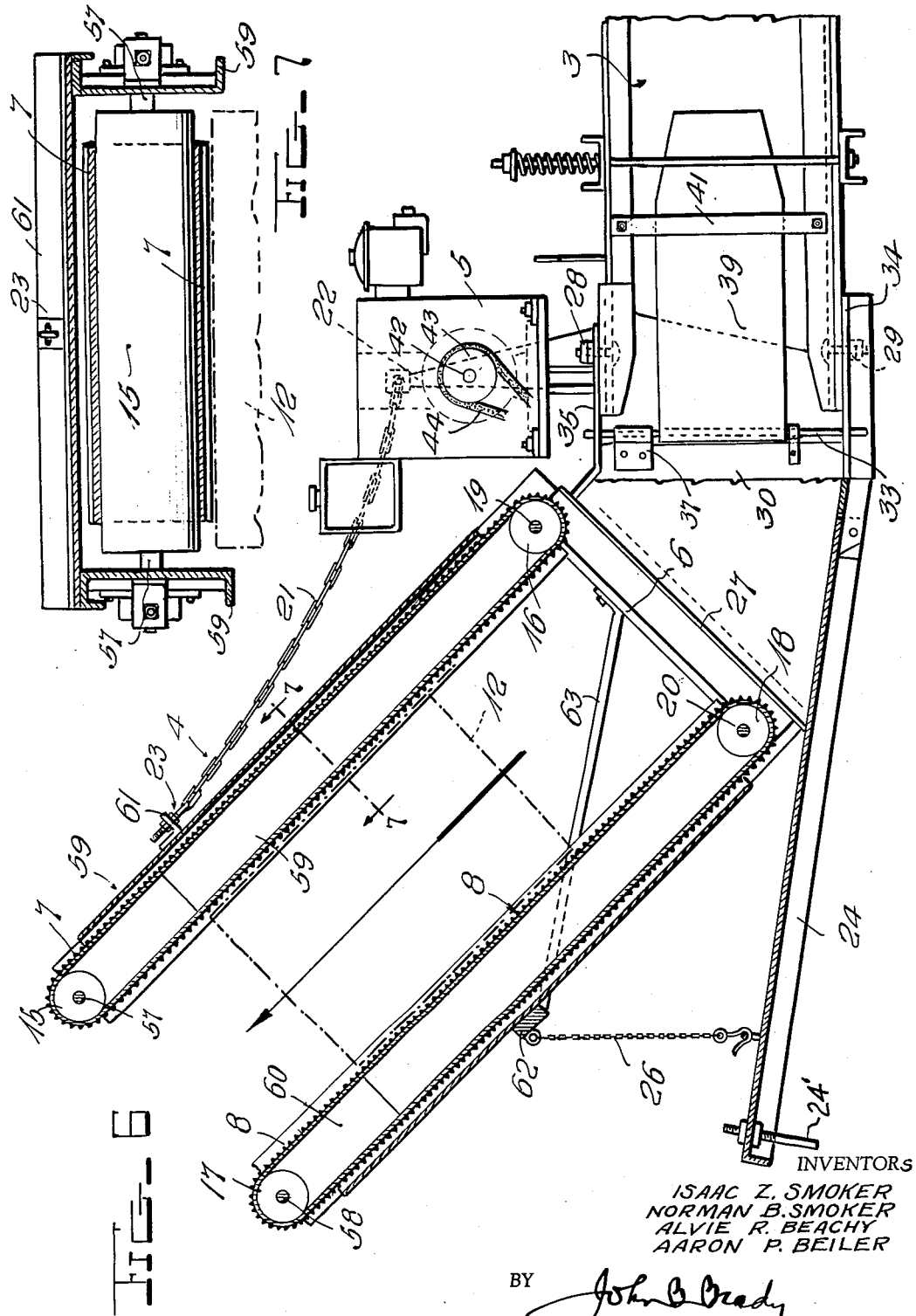

United States Patent Office 3,132,754
Patented May 12, 1964

3,132,754
BALE THROWING ATTACHMENT FOR
BALING MACHINES
Isaac Z. Smoker and Norman B. Smoker, Intercourse, Alvie R. Beachy, Lancaster, and Aaron P. Beiler, Blue Bell, Pa., assignors to Sperry Rand Corporation, New Holland, Pa., a corporation of Delaware
Filed Oct. 2, 1958, Ser. No. 764,880
14 Claims. (Cl. 214—42)

Our invention relates broadly to baling machines and more particularly to a bale-throwing mechanism constituting an attachment for the bale delivery end of a baling machine adapted to receive bales delivered directly to the mechanism by discharge from an automatic hay baler and upon receipt to throw the bales a distance from the baler into a transportation unit for rapid delivery of the bales from the baling machine with minimum expenditure of labor.

One of the objects of our invention is to provide an attachment for baling machines for receiving tied bales from a baling machine and throwing the bales into a transportation unit without physical handling.

Another object of our invention is to provide a conveyor mechanism for attachment to the end of a baling machine for receiving tied bales from the baling machine and throwing the tied bales through a trajectory path into a transportation unit.

Still another object of our invention is to provide a construction of bale-throwing mechanism attachable to the discharge end of the bale chamber of an automatic hay baler which attachment is orientatable for following the direction of movement of the baling machine while in operation in the gathering and baling of hay as part of a harvesting operation.

A further object of our invention is to provide an arrangement of compactly mounted driving unit adapted to be supported adjacent the discharge end of the bale chamber of a baling machine for receiving tied bales and throwing the bales through a trajectory path into a transportation unit for increasing both speed and convenience in the handling of tied bales.

A still further object of our invention is to provide an arrangement of pivotal mounting for a conveyor mechanism on the end of the bale chamber of a baling machine in combination with flexible guide walls for directing tied bales from the end of the terminus of the bale chamber into the conveyor mechanism adapted to shift through a horizontal plane to deliver bales to a transportation unit either to the right or to the left or to the rear of the baling machine for facilitating the handling of tied bales as they are discharged from the bale chamber.

Still another object of our invention is to provide an arrangement of spaced simultaneously driven endless conveyors which are mounted adjacent the rear of the baling chamber of a baling machine for receiving and gripping bales discharged from the bale chamber and imparting sufficient momentum thereto to toss the bales upwardly for delivery into a transportation unit for simplifying the handling of the tied bales.

Other and further objects of our invention reside in the construction of a bale conveyor unit adapted to be pivotally mounted adjacent the rear of the baling chamber of a baling machine for tossing bales discharged from the baling chamber into a transportation unit as the baling machine and transportation unit move along the field as set forth more fully in the specification hereinafter following by reference to the accompanying drawings in which:

FIG. 1 is a schematic view illustrating the application of the conveyor attachment of our invention to a baling machine which is drawn in train formation by a tractor and followed by a transportation unit and illustrating particularly the manner of delivering the tied bales from the baling machine into the transportation unit without manual handling of the tied bales;

FIG. 2 is an enlarged fragmentary side elevational view partially in perspective illustrating the application of the conveyor mechanism of our invention to the end of the baling machine for receiving tied bales from the bale chamber and tossing the bales with sufficient momentum to throw the bales into the transportation unit following the baling machine;

FIG. 3 is a view similar to the view shown in FIG. 2 but looking at the conveyor attachment from the side opposite the side from which the view shown in FIG. 2 is taken;

FIG. 4 is a fragmentary top plan view with parts broken away and shown in section and illustrating the manner of pivoting the conveyor mechanism with respect to the end of the bale chamber of the baling machine;

FIG. 6 is an enlarged longitudinal sectional view taken through the conveyor mechanism and the mounting means therefor adjacent the end of the bale chamber of the baling machine and showing particularly the guide means for directing the discharged bales into the conveyor mechanism; and FIG. 7 is a transverse sectional view taken on line 7—7 of FIG. 6 on an enlarged scale.

Figure 5:
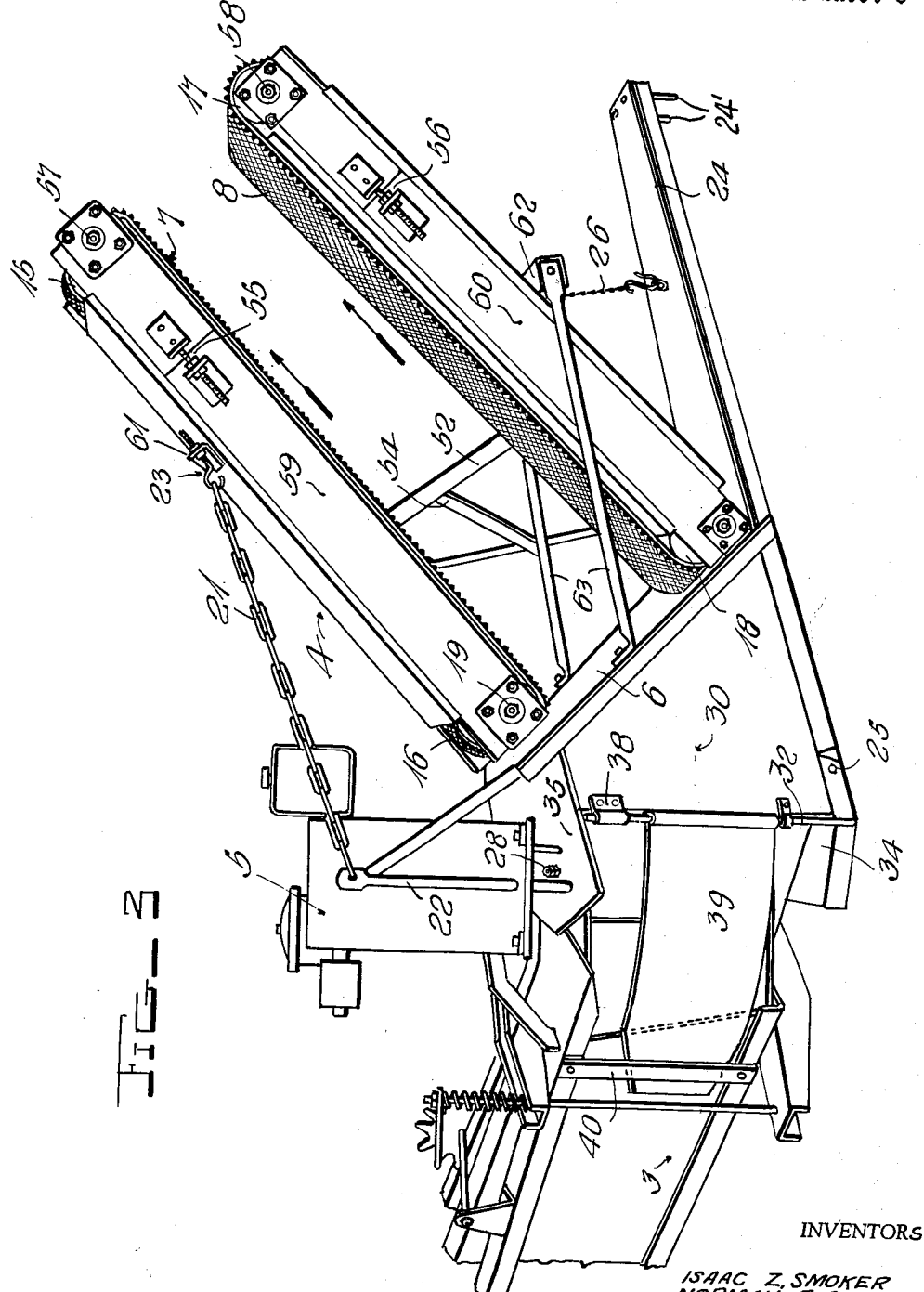
FIG. 5 is a view similar to the view illustrated in FIG. 4 but showing the manner in which the conveyor mechanism orients with respect to the end of the bale chamber of the baling machine for directing tied bales into the transportation unit.

Our invention is directed to a construction of an attachment for the discharge end of baling machines for facilitating the delivery of tied bales from the baling machine into a transportation unit. We provide a conveyor assembly adapted to be pivotally mounted on the rear of a baling machine and orientatable in a horizontal plane with respect to the delivery end of the bale chamber of the baling machine for receiving and directing the tied bales into a transportation unit. The conveyor assembly consists of a pair of spaced endless conveyors which are mounted in superimposed relation spaced approximately the height of a tied bale discharged from the bale chamber and simultaneously driven in the same direction to move bales gripped therebetween in an upward direction and applying a sufficient momentum thereto to throw the tied bale into a trajectory for deposit into a transportation unit located in a generally rearward position with respect to the discharge end of the baling machine. The two endless conveyors are arranged to coact with each other for gripping the top and bottom of the tied bales sufficiently to frictionally engage each of the bales successively, increase the momentum of movement thereof to a velocity sufficient to toss the mass of the bale in a generally upward direction for gravitation into the transportation unit. The two coacting conveyors are spaced from each other according to the height of the bales and may be precisely adjusted to insure the gripping of the successive bales as they are delivered from the discharge end of the bale chamber, increase the velocity thereof for movement in a generally upward direction, and then effect the release thereof at the substantially higher velocity of movement. For this purpose the upper conveyor is biased toward the lower conveyor. We also provide flexible guide means for directing the bales into the conveyor assembly where the conveyor assembly is oriented either to the right or left as the baling machine and transportation unit move through the field and where, under certain conditions, it may be more convenient and practical to load either from the right or the left.

We provide a power unit for driving the conveyor assembly. We utilize a gasoline engine driven unit which is mounted on the orientatable frame which carries the conveyor assembly and which drives, through suitable means, both of the endless conveyors in the same direction. The gasoline engine driven unit is controlled from the operator's position on the tractor which drives the train including the baling machine and the transportation unit. We provide a draw-bar connection from the baling machine to the transportation unit and arrange the conveyor assembly so that it is orientatable in a horizontal plane above the draw-bar connection.

Referring to the drawings in more detail, reference character 1 designates a tractor which draws the baling machine 2 as shown in FIG. 1. The end of the baling machine 2 terminates in a bale chamber in which bales of given lengths are formed, such as thirty to thirty two inches, and from which bales are discharged rearwardly. Such chamber designated generally at 3, adjacent the end of which the conveyor attachment of our invention is mounted as represented generally at 4. The engine shown at 5 is mounted on the frame 6 which supports the conveyor assembly 4. The conveyor assembly 4 includes a pair of spaced endless conveyors 7 and 8 directed generally in an upward direction for tossing bales from the discharge end of the baling machine into the transportation unit 9. As clearly shown in the drawings (FIG. 1), conveyors 7 and 8 are spaced rearwardly of the discharge end of the bale chamber 3, a distance at least substantially as great as the length of bales produced by the baler. The transportation unit 9 is pivotally connected at 9′, FIG. 1, through the draw-bar 10 to the pull-bar 11 extending rearwardly from the baling machine 2. The tied bales which are successively discharged from bale chamber 3 are represented schematically at 12 gripped between the coacting conveyors 7 and 8 and at 14 where the momentum of the bales have been so increased that they are thrown upwardly from the rear of the baling machine 2 through a trajectory and deposited into the transportation unit 9.

The endless conveyors 7 and 8 are shown more clearly in FIGS. 2, 3, and 6, and consist of endless belts which are mounted on rollers journaled in opposite ends of the frame 6 of the conveyor assembly; as represented more clearly in FIG. 6, the upper conveyor 7 is mounted on rollers 15 and 16 journaled on transverse shafts mounted in the frame 6. The lower conveyor 8 is mounted on rollers 17 and 18, journaled in the frame 6. The spatial relation of the rollers 16 and 18 on shafts 19 and 20 is selected so that the endless belts constituting the endless conveyors 7 and 8 have their inner or adjacent faces so spaced that the end of a tied bale discharged from the end of the bale chamber 3 will be elevated by the lower end of the lower conveyor 8 and raised into position to be gripped between the belts and moved upwardly along the inclined belts and the momentum thereof increased so that, at the discharge ends of the belts, the bale is moving at such velocity, the bale enters a trajectory sufficient to deposit the bale into the transportation unit 9 as indicated at 14 in FIG. 1. The roller 18 is arranged above the lowermost level of the bottom of the bale chamber 3 and constitutes a step for lower conveyor 8 by which the emerging end of the bale is stepped up into position where the bale is gripped between the lowermost and uppermost conveyors 8 and 7.

The remote end of the upper conveyor may be lowered about the shaft 19 as a pivot to adjust the spatial relation of the conveyors 7 and 8 at their remote ends. For this purpose we provide an adjustable chain suspension means 21 which is connected to a fixed point on the conveyor assembly 4 provided by the stanchion 22 and the chain connected to an adjustable means 23 on the upper conveyor frame for minutely raising or lowering the conveyor 7 about the shaft 19 as a pivot for thereby adjusting the upper conveyor with respect to the lower conveyor. The weight of conveyor 7 constantly biases it downwardly toward conveyor 8. The conveyor assembly 4 is supported in the position illustrated in FIG. 6 by means of a boom 24 secured to the end of the chassis of the baling machine as represented at 25. The conveyor assembly 4 is braced with respect to boom 24 through the cable 26 and maintained in the upwardly directed position shown in FIGS. 1–3 and FIG. 6 by means of the frame members 27 pivotally mounted at 28 adjacent the top of the bale chamber and pivotally mounted at 29 adjacent the bottom of the bale chamber. Pivots 28 and 29 are vertical and their axes are common, see FIG. 6. The frame members 27 include side walls 30 and 31 which serve as guide means for the bales discharged from the end of the bale chamber 3. These side walls terminate adjacent vertically disposed rod members 32 and 33 which are supported between the bottom plate 34 and the top plate 35 of the frame 6 and stabilized with respect to the side walls 30 and 31 through connecting straps 36 and 37. The rod members 32 and 33 serve as anchor means for the rear ends of the flexible side walls 38 and 39, the forward ends of which are slidable beneath the vertically disposed straps 40 and 41 attached to the exterior sides of the rear end of the bale chamber 3. The flexible side walls 38 and 39 are thus free to shift longitudinally with respect to the rear end of the bale chamber 3 at the same time that they flex from side to side as the frame 6 shifts about the vertically disposed pivots 28 and 29. The side walls 38 and 39 thus provide continuous guides for the tied bales as they are discharged from the end of the bale chamber, throughout all positions of the frame 6, that is, in the aligned position of the frame 6 with the rear end of the bale chamber as shown in FIG. 4, or in the shifted position illustrated in FIGS. 2, 3 and 5.

Lateral shifting of the bale thrower results from changes in the direction of travel of the baler 2. When the baler turns toward the right, the rear end of bale chamber 3 will swing to the left relative to the trailing transportation unit 9. When the baler turns toward the left, the rear end of the bale chamber will swing to the right relative to unit 9. As shown best in FIGS. 3 and 6, boom 24 has depending fingers 24′ at the rear end thereof. Such fingers straddle member 10′ rigid and coextensive with the drawbar 10 (FIG. 1). As a result of this connection between the thrower and drawbar 10, when the bale chamber swings laterally, it pivots relative to the thrower about vertical pivots 28 and 29. The connection between the thrower and drawbar 10 insures that the thrower will always direct bales toward unit 9 regardless of the position of the baler relative to the unit.

The top plate 35 provides a mounting means for the engine 5 which drives the main shaft 42 and driving pulley 43 thereon. A belt 44 is driven by driving pulley 43 and engages the pulleys 45 and 46 carried by the shafts 19 and 20 and is looped around a pulley 47 pivoted on stub shaft 48 carried by the adjustable handlever 49 pivoted on frame 6 at 50. The hand lever 49 may be moved outwardly with a pawl thereon engageable with ratchet tooth 51 on frame member 52 supported on the frame 6 through braces 53 and 54. By shifting the position of hand lever 49 with respect to ratchet tooth 51 the drive belt 44 may be tensioned for imparting driving forces to pulleys 45 and 46 for driving the conveyor belts 7 and 8. The conveyor belts 7 and 8 are tensioned by the adjustment means represented at 55 and 56 which support the journals 57 and 58 for the rollers 15 and 17 in the remote ends of the bifurcated parts 59 and 60 of the frame 6. The part 59 of frame 6, that is, the upper frame has a transverse bar 61 adjacent the upper end thereof which supports the adjustable device 23 which connects the chain 21 with extension 22 supported on the top plate 35 of the frame 6. Thus the upper part 59 is gravitationally suspended and may be adjusted within limits to grip the bales between the two conveyor belts 7 and 8 with such force that sufficient momentum is applied to the bales to throw the bales into the trajectory represented at 40 in FIG. 1. The lower frame of part 60 is supported by the transverse bar 62 fastened between the braces 63, fastened to the frame 6 as shown more clearly in FIG. 3.

As heretofore explained, the system of our invention eliminates all manual handling of the tied bales and as the tractor 1 draws the baling machine 2 through the field for progressively gathering and baling the hay, the tied bales are discharged from the rear end of the bale chamber 3 and guided by the flexible side walls 38 and 39 between the top and bottom plates 35 and 34 and into the bite of the endless conveyors 7 and 8 where the bales are gripped and velocity imparted thereto sufficient to toss the bales from the position shown at 12 to the position illustrated at 14 in FIG. 1 in a trajectory by which the bales are deposited into the transportation unit 9. As the tractor train moves either to the right or left within the field the conveyor assembly 4 orients about pivots 28 and 29 at the same time that the flexible walls 38 and 39 flex from side to side and telescopically extend into and retract from the slots provided in the opposite exterior side walls of the bale chamber 3 and the straps 40 and 41, enabling the bales discharged from the end of the bale chamber to be directed into the conveyor assembly 4 independently of whether the baling machine and the following transportation unit are rounding a curve or continuing in a lineal course.

The speed of operation of engine 5 is controlled from the operator's position on the tractor by push-pull rod 5', FIG. 1, so that the conveyors 7 and 8 so increase the velocity of movement of the bales a desired amount whereby they are thrown or catapulted into the required trajectory clear of the top of the transportation unit and fall therein for storage and transportation while the train is in mobile operation. Moreover, by increasing or decreasing the speed of conveyors 7 and 8, the fore-and-aft point in the unit 9 where the bales will fall can be controlled.

The frame 6 is bifurcated and includes the upwardly extending sections 59 and 60 which are inclined in planes disposed at acute angles to a horizontal axis extending through the bale chamber so that the trajectory path for the bales is directed at such an angle that the bales can be deposited in the transportation unit in whatever location is selected for gathering the bales.

The operation of the automatic hay baler with which the attachment of our invention is associated is continuous and bales are successively delivered directly to the bale throwing mechanism by discharge from the automatic hay baler. Upon receipt of the bales from the discharge end of the automatic hay baler the bale-engaging means of our invention imparts a bale-throwing motion to the bales to toss them to the transportation unit. The bale-engaging means is continuously operated by timed power means connected therewith for carrying the bale through a plural number of throwing motions. These throwing motions are successive and are produced by the continuous motion of the bale-engaging means. The throwing motion is maintained at uniform velocity sufficient to throw the bales a distance from the baler. The engagement between the belts of the bale-engaging means and the bales is frictional and sufficiently yieldable to insure the quick release of the bales from the bale-engaging means. The throwing mechanism is bodily adjustable as a unit as the trajectory plane is changed. Biasing means are carried by the throwing device in bale-contacting relation to the upper surface of the bales emerging from the baling machine for biasing the bales into frictional engagement with the conveyor subject to release of the successive bales into a trajectory path as the bale-engaging means are continuously driven. Hereinafter in the claims we have variously described the bale-engaging means as a rotatable member carried on the frame and onto which each bale is deposited as it is discharged from the discharge end of the baling machine or as an endless belt conveyor or a pair of endless belt conveyors. We desire that it be understood that any type of bale-engaging means is encompassed within the scope of our invention wherever such means is biased into engagement with the surface of the bale as it emerges from the bale discharge chamber for imparting motion to the bale at such velocity that it is thrown through a trajectory path for a distance from the baling machine. Such movement of the bales is wholly automatic and there is no physical handling of the bales required between the time of emergence of the tied bales from the discharge end of the baling machine to the time of deposit through an aerial trajectory into a gathering area or transportation unit.

While we have described our invention in certain preferred embodiments, we realize that modifications may be made and we desire that it be understood that no limitations upon our invention are intended other than may be imposed by the scope of the appended claims.

What we claim as new and desire to secure by Letters Patent of the United States is as follows:

1. A bale-throwing device for baling machines including a bale-forming chamber, said throwing device comprising a frame to be mounted adjacent the bale discharge end of said bale-forming chamber and pivoted thereto for lateral movement with reference to the longitudinal axis of said bale-forming chamber, conveyor means mounted on said frame, said conveyor means including a pair of endless belt conveyors vertically spaced from each other a distance substantially equal to the height of the bales discharged from said bale-forming chamber, means extending between said conveyor means and the discharge end of said bale-forming chamber for laterally guiding bales discharged from said bale-forming chamber into said conveyor means, and means mounted on said frame for driving said endless belt conveyors in opposite directions whereby adjacent portions of said belt conveyors move outwardly away from said bale-forming chamber to thereby throw bales engaged between said belt conveyors into a trajectory path from the rear of the discharge end of said bale-forming chamber.

2. A bale throwing device for baling machines having a bale forming chamber in which bales of given lengths are formed, said throwing device comprising a frame mounted adjacent the bale discharge end of said bale forming chamber and pivoted thereto for movement about a vertical axis in a substantially lateral plane with reference to a longitudinal axis of the bale forming chamber, conveyor means mounted on said frame and spaced rearwardly of said vertical axis such a distance relative to said given bale lengths that each bale is substantially free of said bale forming chamber before engagement with said conveyor means, said conveyor means comprising a pair of endless conveyors spaced apart from each other a distance substantially equal to distance between two opposed sides of bales discharged from said bale forming chamber, means extending between said conveyor means and the discharge end of said bale forming chamber for laterally guiding bales discharged from the bale forming chamber to said conveyor means, and means connected to said endless conveyors for continuously driving them at throwing speed in opposite directions and with adjacent bale engaging portions of the conveyors moving outwardly away from said bale forming chamber to thereby throw bales engaged between the conveyors in a trajectory path from said discharge end of the bale forming chamber, said bale engaging portions being movable and adapted to slip relative to said opposed sides of said bales when in engagement therewith and without tearing the bales.

3. A conveyor attachment for balers having a bale chamber, comprising a frame mounted at the discharge end of said bale chamber and laterally orientable with respect to the longitudinal axis of said bale chamber in a substantially horizontal plane, a conveyor assembly mounted on said frame, conveyor means forming part of said conveyor assembly, means extending between said conveyor means and the discharge end of said bale chamber for laterally guiding bales discharged from the bale chamber into said conveyor means, and means for driving said conveyor means for throwing bales therefrom through a trajectory path, said frame including upper and lower horizontally extending members overlapping the top and bottom of the discharge end of said bale chamber and said frame being pivotally connected to the bale chamber by means comprising individual pivot means extending through the respective upper and lower members, said pivot means being vertically aligned with respect to each other and being located above and below the passage for bales discharged from the bale chamber and spaced from said conveyor means.

4. A conveyor attachment for balers having a bale chamber, comprising a frame mounted at the discharge end of said bale chamber and laterally orientable with respect to the longitudinal axis of said bale chamber in a substantially horizontal plane, a conveyor assembly mounted on said frame, conveyor means forming part of said conveyor assembly, means extending between said conveyor means and the discharge end of said bale chamber for laterally guiding bales discharged from the bale chamber into said conveyor means, and means for driving said conveyor means for throwing bales therefrom through a trajectory path, said frame including a bifurcated portion having a pair of substantially linearly extending parallel sections, each section being inclined in an upward direction from the discharge end of said bale chamber, and said conveyor means comprising two endless belt conveyors, one of said conveyors being mounted in one of the aforesaid sections and the other of said conveyors being mounted in the other of the said sections, the said conveyors being spaced from each other a distance substantially equal to the height of the bales discharged from said bale chamber for receiving bales discharged from said bale chamber and imparting increasing velocity thereto whereby they are thrown in a trajectory path.

5. A conveyor attachment for balers as set forth in claim 4, wherein a boom is connected to the lower portion of the discharge end of the bale chamber, and means is provided connecting one of said sections of said frame to said boom, and wherein a stanchion is mounted on said frame, the other of said sections being connected to said stanchion.

6. A bale thrower mountable on the discharge end of the bale chamber of a hay baler from which bales of given lengths emerge, comprising a frame, bale engageable trajecting means mounted on said frame and adapted to receive and throw bales discharged to it from the baler in an elevated trajectory, power means continuously moving said trajecting means as each bale is moving from said bale chamber and means for mounting said frame on the bale chamber with said trajecting means extending at its trajecting angle and spaced from said bale chamber such a distance relative to said given bale lengths that each bale is at least substantially discharged from the bale chamber before engagement with the continuously moving trajecting means whereby each bale is free of interference from the bale chamber while being thrown.

7. In combination, a hay baler having a bale chamber in which bales are formed and from which bales of given lengths emerge, trajecting means adapted to receive and throw bales discharged to it after emergence from the bale chamber in an elevated trajectory, said trajecting means including rotatable means engageable with one side of each discharged bale and means reactingly engaging the opposite side of each bale and reinforcing the engagement of the rotatable means with each bale, power means continuously rotating said rotatable means while each given bale is emerging from said bale chamber, and means supporting said trajecting means for movement at its trajecting angle and spaced from said bale chamber such a distance relative to said given bale lengths that each bale is at least substantially discharged from the bale chamber before engagement with said trajecting means whereby each bale is free of interference from the bale chamber while being thrown.

8. In combination, a hay baler having a bale chamber in which bales are formed and from which bales of given lengths emerge, trajecting means adapted to receive and throw bales discharged to it from the baler in an elevated trajectory, said trajecting means including rotatable means which engages each of two opposite sides of each discharged bale, power means continuously rotating said rotatable means while each bale is emerging from said bale chamber, said rotatable means being movable and adapted to slip relative to said two opposite sides of each discharged bale when in engagement therewith and without tearing the bale, and means supporting said trajecting means for movement at its trajecting angle and spaced from said bale chamber such a distance relative to said given lengths that each bale is at least substantially discharged from the bale chamber before engagement with said trajecting means whereby each bale is free of interference from the bale chamber while being thrown.

9. A combination as recited in claim 8 wherein said rotatable means comprises a lower rotatable element engageable with the bottom of each discharged bale and an upper rotatable element engageable with the top of each bale, said rotatable elements being so disposed relative to each other that each bale first engages said lower rotatable element and is lifted thereby into engagement with said upper rotatable element.

10. In combination, a hay baler movable over the ground and having a fore-and-aft extending bale chamber in which bales of given lengths are formed and from which bales emerge rearwardly, bale trajecting means connected to said baler to traject bales discharged from said bale chamber and for lateral swinging movement relative thereto, said trajecting means including movable bale engaging means spaced rearwardly from said bale chamber a distance at least substantially as great as said given lengths and operable to engage and throw each bale only after each bale is substantially discharged and free of said chamber, direction control means for swinging said trajecting means relative to said baler whereby the direction of bale trajectory relative to the baler may be varied, and means extending between said trajecting means and said bale chamber for laterally guiding bales to the trajecting means without damaging the bales.

11. In combination, a hay baler movable over the ground having a bale chamber in which bales of given lengths are formed and from which bales emerge rearwardly, a wagon towed by and behind said baler, bale trajecting means mounted on said baler for lateral swinging movement as a unit relative thereto and about a vertical axis, said trajecting means including continuously moving bale engaging means in the path of discharged bales and spaced from said bale chamber a distance at least substantially as great as said given bale lengths whereby the trajecting means is operable to engage and throw each bale into said wagon only after each bale is substantially discharged from and free of the bale chamber, and direction control means interconnecting said wagon and said trajecting means and moving said trajecting means in response to relative movement between said baler and said wagon whereby the trajectory of the bale terminates in said wagon regardless of the position of the baler relative to the wagon.

12. For a baler having bale-forming means including a bale-discharge portion from which individual completed bales emerge rearwardly in succession as the baler operates: bale-throwing apparatus for throwing each emerging bale distantly rearwardly from the bale-discharge portion of the baler, comprising: a bale support having means thereon for connection thereof to the baler and extending rearwardly from the bale-discharge portion generally as an extension of said portion; a pair of bale-throwing means on the support and spaced apart transversely of the path of the emerging bale as it enters the support, each bale-throwing means including front and rear guide members respectively adjacent to and remote from the bale-discharge portion and an endless flexible element trained about said members to dispose an inner run of each element in flanking relation to the proximate fore-and-aft portion of the emerging bale so that such emerging bale enters between the respective inner runs to be engaged by said run; drive means interconnecting the two bale-throwing means so that the inner runs thereof move rearwardly in unison to carry the bale rearwardly therewith; and relatively high-speed power mechanism connected to and driving the drive means rapidly to cause the bale to depart rearwardly beyond the support by its own momentum.

13. In combination, a hay baler movable over the ground and from which bales emerge, a wagon towed behind said baler, continuously operating trajecting means mounted on said baler for receiving each bale after it emerges and trajecting the bale into said wagon, power means driving said trajecting means, and control means for said power means to regulate the speed of operation of said trajecting means so that the length of the bale trajectory may be varied to selectively control the point of deposit of each bale in said wagon whereby a load of bales may be evenly distributed throughout the length of the wagon, said control means being effectively operable to regulate the speed of the trajecting means irrespective of the speed of operation of the baler.

14. In combination, a hay baler movable over the ground and having a fore-and-aft extending bale chamber from which successive bales emerge rearwardly, a wagon behind and spaced from said baler, said wagon having a forwardly extending tongue connected to the baler and pivotal about a vertical axis relative thereto, said wagon trailing directly behind the baler when the baler is traveling forwardly and becoming angularly disposed relative thereto when the baler changes its direction of travel, a bale-thrower mounted on said bale chamber and operative to throw each discharged bale across the space between said baler and wagon and into the wagon regardless of the position of the wagon relative to the baler, said bale thrower including bale engageable trajecting means positioned along the longitudinal axis of the bale chamber to receive each discharged bale, means pivotally connecting said trajecting means to said bale chamber for lateral swinging movement relative thereto, the thrower being so mounted relative to the bale chamber that said trajecting means is wholly rearwardly of the chamber regardless of its lateral position and permits free emergence of each bale from the bale chamber, and direction control means connected to said thrower to swing the thrower laterally about said pivotal connection means whereby the direction of trajectory of the bales from the bale chamber to the wagon may be varied.

References Cited in the file of this patent

UNITED STATES PATENTS

| | | |
|---|---|---|
| 1,044,547 | Liggett | Nov. 19, 1912 |
| 2,024,458 | Kraft | Dec. 17, 1935 |
| 2,077,000 | Miller et al. | Apr. 13, 1937 |
| 2,490,381 | Shields | Dec. 6, 1949 |
| 2,608,310 | De Penning | Aug. 26, 1952 |
| 2,613,800 | Merck | Oct. 14, 1952 |
| 2,785,811 | Forth | Mar. 19, 1957 |
| 2,812,052 | Doyer | Nov. 5, 1957 |
| 2,894,651 | Forth | July 14, 1959 |